United States Patent [19]

Chyung

[11] 4,028,121

[45] June 7, 1977

[54] LEAD FELDSPAR GLASS-CERAMIC BODIES

[75] Inventor: Kenneth Chyung, Elmira, N.Y.

[73] Assignee: Corning Glass Works, Corning, N.Y.

[22] Filed: July 18, 1975

[21] Appl. No.: 597,249

[52] U.S. Cl. .................................. 106/39.8; 65/33; 106/53; 252/518

[51] Int. Cl.² .......................................... C03C 3/22

[58] Field of Search ................. 106/39.8, 53; 65/33

[56] References Cited

UNITED STATES PATENTS

| | | | |
|---|---|---|---|
| 3,084,053 | 4/1963 | Arlett et al. | 106/39.7 |
| 3,586,522 | 6/1971 | Hoffman | 106/39.8 |
| 3,700,741 | 10/1972 | Duke | 106/39.8 |
| 3,883,337 | 5/1975 | Helgesson | 65/33 |
| 3,940,255 | 2/1976 | Harrington et al. | 65/33 |
| 3,950,174 | 4/1976 | Suzuki et al. | 106/53 |

Primary Examiner—Helen M. McCarthy

Attorney, Agent, or Firm—Clinton S. Janes, Jr.; Clarence R. Patty, Jr.

[57] ABSTRACT

This invention is directed to the production of glass-ceramic bodies having compositions within the $PbO$-$Al_2O_3$-$SiO_2$ field nucleated with $TiO_2$, wherein the principal crystal phase is a lead feldspar solid solution. Such articles can have use temperatures up to 1250° C. and exhibit very high electrical resistivities, with very low loss tangents, and relatively low coefficients of thermal expansion (less than about $35 \times 10^{-7}/°$ C. over the temperature range of 25°–300° C.) such as to recommend their use as stovetops for electric ranges. More particularly, this invention relates to glass-ceramic bodies having compositions consisting essentially, by weight on the oxide basis, of about 26–45% $PbO$, 12–28% $Al_2O_3$, 30–50% $SiO_2$, and at least 3% but less than 6% $TiO_2$ as a nucleating agent.

9 Claims, No Drawings

LEAD FELDSPAR GLASS-CERAMIC BODIES

BACKGROUND OF GLASS-CERAMIC PRODUCTION

A glass-ceramic article is manufactured through the controlled heat treatment of a precursor glass body which causes the latter to be crystallized in situ. The production of the conventional glass-ceramic article comprises three general steps. First, a glass-forming batch, to which a nucleating agent is commonly added, is compounded and melted. Second, the resulting melt is simultaneously cooled rapidly enough to produce a crystal-free glass and an article of a desired geometry shaped therefrom. Third, the glass article is subjected to a particular heat treatment schedule to cause the glass to crystallize in situ. Customarily, this crystallization step is carried out in two parts. Thus, the glass article is initially heated to a temperature in the proximity of the annealing point thereof to develop nuclei in the glass and, thereafter, the temperature is raised (normally above the softening point of the glass) to cause the growth of crystals on the nuclei.

The crystallization in situ mechanism involves the essentially simultaneous growth of crystals on countless nuclei distributed throughout the glass body so that the microstructure of the normal glass-ceramic article consists of relatively uniformly-sized, fine-grained crystals homogeneously dispersed, but randomly oriented, within a residual glassy matrix, the crystal phase commonly constituting the predominant proportion of the article. Hence, glass-ceramic articles are customarily at least 50 percent and, frequently, are actually 75% crystalline. This very high crystallinity commonly results in articles demonstrating chemical and physical properties quite different from those of the parent or precursor glass. Hence, the characteristics of a glass-ceramic article will normally approximate those of the crystal phase. Moreover and self-evidently, the residual glassy matrix will not only be small in amount but will also have a far different composition from that of the parent glass inasmuch as the components comprising the crystal phase will have been removed therefrom.

Since the manufacture of glass-ceramic articles is founded in the crystallization in situ of precursor glass bodies, conventional glass-forming fabrication processes such as blowing, casting, drawing, pressing, rolling, spinning, etc. can be utilized in shaping articles of desired configurations and dimensions. Furthermore, the presence of the residual glassy matrix insures that the glass-ceramic article is essentially free of voids and is non-porous.

For a more complete discussion of the theoretical concepts and practical considerations inherent to the production of glass-ceramic articles, reference is hereby made to U.S. Pat. No. 2,920,971, the basic patent in the field of glass-ceramics. That patent describes the glass-ceramic article as being predominantly crystalline, i.e., greater than 50% crystalline, and explains that the crystal phases developed in glass-ceramic articles are a function of the parent glass composition and the heat treatment parameters to which the parent glass is subjected.

Discussion of the Prior Art

U.S. Pat. No. 3,700,471 discloses the production of glass-ceramic articles consisting essentially, by weight, of about 10–45% PbO, 10–25% $Al_2O_3$, and 35–65% $SiO_2$ with a nucleating agent selected from the group consisting of 6–12% $TiO_2$ and/or 3–10% $ZrO_2$ + 5–15% $P_2O_5$, the sum of $TiO_2$ + $ZrO_2$ + $P_2O_5$ constituting no more than about 23% of the total composition, wherein alpha-cristobalite and/or a lead feldspar comprises the principal crystal phase. Where the PbO content is less than about 25%, alpha-cristobalite will comprise the bulk of the crystallization and the coefficient of thermal expansion of the articles will range about 150–200 × $10^{-7}/°$ C. (25°–300° C.). Where the PbO content is greater than about 25%, lead feldspar will constitute the predominant crystal phase and the coefficient of thermal expansion will range between about 40–70 × $10^{-7}/°$ C. (25°–300° C.). The articles are stated to be highly crystalline after heat treatment at temperatures between 700°–1200° C., i.e., greater than 50% and, normally, greater than 75% crystalline.

U.S. Pat. No. 3,586,522 discloses glass-ceramic bodies having crystal contents less than 50%, and preferably less than 40%, prepared by heat treating glasses consisting essentially, by weight, of 1–25% $Al_2O_3$, 2–20% $TiO_2$, 21–45% PbO, 20–38% $SiO_2$, with a large number of possible operational ingredients. The crystal phases identified after heat treatment at 800°–900° C. were $BaAl_2Si_2O_8$ (hexacelsian) as the principal phase and $Al_2TiO_5$ may sometimes be present.

Summary of the Invention

The present invention produces glass-ceramic articles which exhibit very high electrical resistivities (log $\rho$ at 200° C. of at least 10 and at 500° C. of at least 7) and dielectric constants (at least 5 at 25° C. and 1 KC), coupled with low loss tangents (less than 0.001 at 25° C. and 100 KC), and relatively low coefficients of thermal expansion, viz., less than about 35 × $10^{-7}/°$ C. over the temperature range of 25°–300° C. Such articles are formed through the crystallization in situ of glass bodies consisting essentially, by weight on the oxide basis, of about 26–45% PbO, 12–28% $Al_2O_3$, 30–50% $SiO_2$, and at least 3% but less than 6% $TiO_2$ as a nucleating agent. Crystallization of the glass requires temperatures between about 950°–1200° C. The final articles are highly crystalline with very fine crystals of a lead feldspar solid solution (basically $PbO.Al_2O_3.2SiO_2$) constituting the bulk of the crystal phase with minor amounts of rutile ($TiO_2$) frequently being present also.

Description of the Preferred Embodiments

Table I records a group of glasses, expressed in weight percent of the oxide basis, which illustrate the composition parameters of the instant invention. The batch ingredients therefore may comprise any materials, either the oxides or other compounds, which, when melted together, are converted to the desired oxide compositions in the proper proportions. The batch ingredients were compounded, ballmilled together to aid in achieving a homogeneous melt, and then run into platinum crucibles. After covering the crucibles, they were placed into a gas-fired furnace and melted for about 16 hours at temperatures between about 1500°–1600° C. The molten batch was poured into settl molds to yield a slab about 6 × 6 × ½ inches and this slab transferred to an annealer operating at 650° C.

Although the following examples involved laboratory crucible melts only, it will be appreciated that the compositions can be compounded in quantities for pot melts or commercial-sized continuous tank melts where desired. Also, if deemed necessary, $As_2O_5$ or other conventional fining agent may be included in the batch.

TABLE I

|  | 1 | 2 | 3 | 4 | 5 | 6 | 7 | 8 | 9 | 10 |
|---|---|---|---|---|---|---|---|---|---|---|
| $SiO_2$ | 33.33 | 39.15 | 35.91 | 41.43 | 36.24 | 35.90 | 36.68 | 46.19 | 25.71 | 42.57 |
| $Al_2O_3$ | 23.81 | 17.08 | 20.38 | 15.72 | 18.48 | 20.19 | 18.93 | 15.72 | 21.81 | 18.10 |
| PbO | 38.10 | 37.17 | 26.76 | 30.76 | 28.33 | 28.06 | 27.26 | 30.95 | 47.72 | 23.81 |
| BaO | — | — | 12.19 | 7.33 | 12.19 | 12.08 | 6.28 | 2.38 | — | 10.76 |
| SrO | — | — | — | — | — | — | 6.09 | — | — | — |
| MgO | — | 0.94 | — | — | — | — | — | — | — | — |
| $TiO_2$ | 4.76 | 5.66 | 4.76 | 4.76 | 4.76 | 3.77 | 4.76 | 4.76 | 4.76 | 4.76 |

After annealing to room temperature, the glass slabs from Table I were examined for glass quality, test specimens cut therefrom, and those specimens placed into an electrically-fired furnace where each was exposed to the heat treatment schedules reported in Table II.

In the most general terms, the recrystallization in situ of the precursor glass bodies requires exposure thereof to temperatures between about 950°–1200° C. As is the case with the production of conventional glass-ceramic articles, the rate of crystallization is a function both of time and temperature. Therefore, a longer exposure period will be demanded in the cooler portions of the range, perhaps as long as 24 hours; whereas exposure times as brief as 15 minutes may be sufficient at the hotter extreme of the range to achieve a highly crystalline article.

In the laboratory specimens discussed herein, the glass bodies were cooled to room temperature to permit visual inspection of glass quality. However, this cooling to room temperature is not required to obtain satisfactory crystallization within the article. Nevertheless, it is necessary for the melt to be cooled to at least within the transformation range prior to subjecting the glass body to the proper crystallization heat treatment. (The transformation range has been defined as the temperature at which a liquid melt is deemed to have been transformed into an amorphous solid; that temperature has conventionally been considered to lie in the vicinity of the annealing point of the glass.)

The preferred crystallization practice comprises two steps. In the first, the glass body is heated to a temperature somewhat above the transformation range, viz., at a temperature between about 700°–800° C., and maintained within that range for a period of time sufficient to secure good nucleation. In the second step, the nucleated glass article is heated to a temperature within the crystallization range for a sufficient length of time to insure essentially complete crystallization. This preferred practice contemplates a nucleation period of about 1–6 hours and a period for crystallization of about 1–8 hours.

Although the two-step heat treatment schedule constitutes the preferred manner for conducting the crystallization step, it must be recognized that numerous modifications in method are possible, the sole mandatory parameter to be observed being a crystallization temperature between about 950°–1200° C.

As was explained above, the rate of crystal growth is dependent upon temperature. Hence, at temperatures within the nucleation range, crystal growth is very slow so that the glass body is quite prone to thermal deformation. Therefore, the rate at which the glass body is heated at temperatures above the annealing range must not be so rapid that there is not adequate time for a growth of crystals sufficient to provide support for the body. Heating rates of 10° C/minute and greater can be successfully utilized where physical support is provided for the glass body to inhibit deformation. However, very little slumping or deformation will be experienced over the composition ranges operable in the instant invention where heating rates not exceeding about 3°–5° C./minute are employed. These latter rates, then, delineate the preferred practice. The use of a dwell period within the nucleation range is useful in minimizing body deformation inasmuch as such results in more rapid and uniform subsequent crystallization.

The specimens recorded in Table II were heated at about 5° C/minute to the dwell temperatures listed. When the crystallization schedule was completed, the electric current to the furnace was cut off and the articles permitted to cool to room temperature within the furnace. This cooling practice has been denominated "cooling at furnace rate" and the rate of cooling has been estimated to be about 3°–5° C./minute. More rapid rates of cooling are possible, particularly in the case of thin-walled articles, but this practice of cooling at furnace rate is very convenient in the laboratory.

Table II also sets out a visual description of the final article and the crystal phases present therein as identified through X-ray diffraction analyses. The coefficient of thermal expansion ($\times 10^{-7}$/°C.) over the range of 25°–300° C., the modulus of rupture (psi), the dielectric constant at 1 KC and 25° C., the D.C. resistivity (log $\rho$ at 200° C. and 500° C.), and the loss tangent at 100 KC and 25° C. are reported where determined in accordance with conventional measuring procedures.

TABLE II

| Example No. | Visual Description | Crystal Phases | Coef. Exp. | Modulus of Rupture | Log $\rho$ at 200° C. | Log $\rho$ at 500° C. | Dielectric Constant | Loss Tangent | Heat Treatment |
|---|---|---|---|---|---|---|---|---|---|
| 1 | White opaque, very fine-grained | PbO . $Al_2O_3$ . $2SiO_2$ solid solution, rutile | 32.7 | — | 13.7 | 9.3 | 6.4 | 0.0002 | 750° C. for 4 hours 1000° C. for 4 hours |
| 2 | White opaque, fine-grained | " | 25.5 | 12,500 | — | — | — | — | " |
| 3 | White opaque, medium-grained | " | 29.1 | 13,700 | — | — | — | — | " |
| 4 | White opaque, very fine-grained | " | 23.6 | 15,300 | 14.0 | 9.1 | 8.6 | 0.0001 | 750° C. for 4 hours 1100° C. for 4 hours |
| 5 | " | " | 25.5 | 11,600 | 12.0 | 7.6 | 10.6 | 0.0001 | " |

TABLE II-continued

| Example No. | Visual Description | Crystal Phases | Coef. Exp. | Modulus of Rupture | Log ρ at 200° C. | Log ρ at 500° C. | Dielectric Constant | Loss Tangent | Heat Treatment |
|---|---|---|---|---|---|---|---|---|---|
| 6 | White opaque, medium-grained | " | 4.4 | 4,000 | 13.6 | 9.6 | 9.0 | 0.0001 | 750° C. for 4 hours 1000° C. for 4 hours |
| 7 | White opaque, fine-grained | " | — | — | — | — | — | — | 750° C. for 4 hours 1100° C. for 4 hours |
| 8 | " | " | 27.2 | — | — | — | — | — | " |
| 9 | White opaque coarse-grain | PbO . Al$_2$O$_3$ . 2SiO$_2$ solid solution, rutile, PbTiO$_3$ | — | Very weak | — | — | — | — | 750° C. for 4 hours 1000° C. for 4 hours |
| 10 | White opaque very fine-grained | PbO . Al$_2$O$_3$ . 2SiO$_2$ solid solution, rutile, alpha-cristobalite | 54.5 | 7,500 | — | — | — | — | 750° C. for 4 hours 1100° C. for 4 hours |

Tables I and II are illustrative of the compositional parameters which must be observed to achieve products demonstrating the desired physical properties. Thus, a coarse-grained product and/or undesirable crystal phases can be developed as is illustrated in Examples 9 and 10. BaO, and to a lesser extent SrO, appear to form an extensive solid solution in lead feldspar and the presence of either or both improves the refractoriness of the crystallized body (Example 4 exhibited a use temperature of 1250° C. without deformation) and commonly yields a finer grained microstructure than where PbO is present alone. Furthermore, BaO inhibits the formation of alpha-cristobalite and thereby insures a body of low expansion. Therefore, BaO can advantageously be present up to about 20% and SrO up to about 15%, the total of these components not exceeding about 20%. The addition of MgO and ZnO can lead to the development of spinel (MgO.Al$_2$O$_3$) and gahnite (ZnO.Al$_2$O$_3$) which can adversely affect the final physical characteristics of the articles. Hence, no more than about 5% total of these components is preferred. Additions of such ingredients as Na$_2$O, K$_2$O, B$_2$O$_3$, and P$_2$O$_5$ not only severely reduce the refractoriness of the final product but, particularly the Na$_2$O and K$_2$O, can result in the growth of unwanted crystal phases. The inclusion of alkali metals can also lower the electrical resistivity and increase the loss tangent of the crystalline products. Therefore, here again, the total of those constituents, if present at all, will not exceed about 5%. Li$_2$O will also be desirably absent since it leads to the crystallization of beta-eucryptite or beta-spodumene. Less than 2% can be tolerated. CaO appears to inhibit crystal growth and will not be included in amounts greater than about 3%.

The crystal content of the final products is greater than 50% by volume and customarily exceeds 75%, depending upon the extent to which the components of the batch are adaptable to the formation of crystal phases and the crystallization heat treatment schedule utilized. The crystals, themselves, are reasonably uniformly fine-grained, substantially all being finer than 5 microns in diameter and, in those articles designated "fine-grained," the crystals are less than about 1 micron in diameter.

Example 4 is my preferred composition since it combines a high strength with excellent refractoriness, a relatively low coefficient of thermal expansion, and good electrical properties. The overall preferred composition area consists essentially of 26–40% PbO, 5–15% BaO, 15–22% Al$_2$O$_3$, 30–45% SiO$_2$, 0–8% SrO and 4–5% TiO$_2$.

I claim:

1. A glass-ceramic article exhibiting a coefficient of thermal expansion (25°–300° C.) of less than 35 × 10$^{-7}$/°C., a D.C. resistivity (log ρ) at 200° C. of at least 10 and at 500° C. of at least 7, a dielectric constant at 1 KC and 25° C. of at least 5, and a loss tangent at 100 KC and 25° C. of less than 0.001, and consisting essentially of substantially uniformly-sized crystals homogeneously dispersed within a glassy matrix, said crystals comprising at least 50% by volume of the article, substantially all of said crystals having a grain size less than about 1 micron in diameter, and consisting predominantly of lead feldspar solid solution (basically PbO.Al$_2$O$_3$.2SiO$_2$), said article consisting essentially, by weight on the oxide basis, of about 26–45% PbO, 12–28% Al$_2$O$_3$, 30–50% SiO$_2$, and at least 3% but less than 6% TiO$_2$.

2. A glass-ceramic article according to claim 1 also containing up to 20% BaO and/or up to 15% SrO, the total of those components not exceeding about 20%.

3. A glass-ceramic article according to claim 1 consisting essentially, by weight on the oxide basis, of about 26–40% PbO, 5–15% BaO, 15–22% Al$_2$O$_3$, 30–45% SiO$_2$, 0–8% SrO, and 4–5% TiO$_2$.

4. A method for making a glass-ceramic article exhibiting a coefficient of thermal expansion (25°–300° C.) of less than 35 × 10$^{-7}$/° C., a D.C. resistivity (log ρ) at 200° C. of at least 10 and at 500° C. of at least 7, a dielectric constant at 1 KC and 25° C. of at least 5, and a loss tangent at 100 KC and 25° C. of less than 0.001, and consisting essentially of substantially uniformly-sized crystals homogeneously dispersed within a glassy matrix, said crystals constituting at least 50% by volume of the article, substantially all of said crystals having a grain size less than about 1 micron in diameter, and consisting predominantly of lead feldspar solid solution (basically PbO.Al$_2$O$_3$.2SiO$_2$), which comprises the steps of:

a. melting a batch for a glass consisting essentially, by weight on the oxide basis, of about 26–45% PbO, 12–28% Al$_2$O$_3$, 30–50% SiO$_2$, and at least 3% but less than 6% TiO$_2$;
   b. simultaneously cooling the melt to at least within the transformation range and shaping a glass article therefrom;
   c. heating said glass article to a temperature within the range of about 950°–1200° C. for a period of time sufficient to cause the growth of said lead feldspar solid solution crystals; and then
   d. cooling to room temperature.

5. A method according to claim 4 wherein said glass also contains up to 20% BaO and/or up to 15% SrO, the total of those components not exceeding about 20%.

6. A method according to claim 4 wherein said glass consists essentially, by weight on the oxide basis, of about 26–40% PbO, 5–15% BaO, 15–22% $Al_2O_3$, 30–45% $SiO_2$, 0–8% SrO, and 4–5% $TiO_2$.

7. A method according to claim 4 wherein said glass article is heated to a temperature between about 700°–800° C. for a period of time sufficient to cause nucleation therein prior to being heated to 950°–1200° C. to cause crystallization.

8. A method according to claim 7 wherein said period of time sufficient to cause nucleation ranges between about 1–6 hours.

9. A method according to claim 4 wherein said period of time sufficient to cause the growth of said lead feldspar solid solution crystals ranges between about 15 minutes to 24 hours.

* * * * *

UNITED STATES PATENT AND TRADEMARK OFFICE
CERTIFICATE OF CORRECTION

PATENT NO. : 4,028,121
DATED : June 7, 1977
INVENTOR(S) : Kenneth Chyung

It is certified that error appears in the above-identified patent and that said Letters Patent are hereby corrected as shown below:

Column 1, line 33, after "75%" insert -- by volume --.

Column 2, line 61, "settl" should be -- steel --.

Signed and Sealed this

Twenty-fourth Day of January 1978

[SEAL]

Attest:

RUTH C. MASON
Attesting Officer

LUTRELLE F. PARKER
Acting Commissioner of Patents and Trademarks